US007983712B2

(12) United States Patent
Mayer et al.

(10) Patent No.: US 7,983,712 B2
(45) Date of Patent: Jul. 19, 2011

(54) MULTI-MODE WIRELESS COMMUNICATION DEVICES AND SYSTEMS FOR PREPAID COMMUNICATION SERVICES

(75) Inventors: Daniel Jitzchak Mayer, Warren, NJ (US); Jay Barsky, Hollis Hills, NY (US); Patrick John Gartner, Monroe, NJ (US)

(73) Assignee: IDT Corporation, Newark, NJ (US)

( * ) Notice: Subject to any disclaimer, the term of this patent is extended or adjusted under 35 U.S.C. 154(b) by 711 days.

(21) Appl. No.: 11/527,114

(22) Filed: Sep. 26, 2006

(65) Prior Publication Data

US 2008/0076385 A1  Mar. 27, 2008

(51) Int. Cl.
*H04M 1/00* (2006.01)
*H04M 11/00* (2006.01)
*H04W 4/00* (2009.01)

(52) U.S. Cl. ...... 455/553.1; 455/405; 455/407; 455/432.1; 455/432.3; 455/435.2

(58) Field of Classification Search ........ 370/486, 370/408, 406; 455/405–407, 425, 4, 12.1, 455/412.2, 414.1, 414.2, 414.3, 552.1
See application file for complete search history.

(56) References Cited

U.S. PATENT DOCUMENTS

| 6,088,431 | A  | * | 7/2000 | LaDue ................. 379/114.2 |
| 6,542,813 | B1 | * | 4/2003 | Kovacs ................. 701/208 |
| 7,039,408 | B2 | * | 5/2006 | Chitrapu et al. ........... 455/438 |
| 7,039,420 | B2 | * | 5/2006 | Koskinen et al. ......... 455/456.1 |
| 7,395,075 | B2 | * | 7/2008 | Posner et al. ............ 455/456.1 |
| 7,668,508 | B2 | * | 2/2010 | Zheng et al. ............ 455/41.2 |
| 2002/0119767 | A1 | * | 8/2002 | Fieldhouse et al. ........ 455/406 |
| 2005/0251326 | A1 | * | 11/2005 | Reeves ................. 701/200 |
| 2006/0072542 | A1 | * | 4/2006 | Sinnreich et al. .......... 370/351 |
| 2006/0120519 | A1 |   | 6/2006 | Tamari et al. ............ 379/114.2 |

OTHER PUBLICATIONS

Brewin, "Motorola & HP Dual-Mode Features" Aug. 2, 2004 (1 pp).
Buddhikot et al., "New Technologies for Integrated Public Wirless Networks" Lucent Technologies, Aug. 25, 2004 (37 pps).
Hochmuth, "Trio to Combine Cell and Wireless LANs" Network World, Jul. 26, 2004 (3 pps).
James, "HP's Pocket PC Phone is Here" Hewlett-Packard (1 page).
Lehr et al., "Wireless Internet Access: 3G vs. WiFi?" Aug. 23, 2002 (21 pps).
Performance Technologies, "GSM/WLAN—Authentication Gateway" Mar. 1, 2004 (2 pps).
International Search Report and Written Opinion dated Feb. 29, 2008 based on PCT application No. PCT/US07/20761.
Avaya, "Avaya Unveils New Wireless IP Telephony Products for Converged Mobility Throughout—and Beyond—an Enterprise," Jul. 2004, 2 pp.
Bellalta et al., "Performance of the GPRS RLC/MAC Protocols with VOIP Traffic," Sep. 2002, 5 pp.

(Continued)

*Primary Examiner* — Un C Cho
(74) *Attorney, Agent, or Firm* — Ohlandt, Greeley, Ruggiero & Perle, LLP

(57) ABSTRACT

There is provided a multi-mode wireless communication device. A cellular transceiver communicates over a cellular network in a cellular mode. A wireless transceiver communicates over a wireless network in a wireless mode. A selector makes a selection between operating in the cellular mode and the wireless mode. The selector uses a subscriber profile and other information, such as financial information, to make the selection. The subscriber profile includes information such as a minimally acceptable quality of service acceptable for a communication.

24 Claims, 8 Drawing Sheets

OTHER PUBLICATIONS

Dong et al., "Maintaining Quality of Service on Integrating Mobile Ad hoc Networks with 4G, Cellular Networks" Broadband Wireless and Internetworking Research Laboratory, SITE, University of Ottawa, Feb. 2004, 7 pp.

Handa, "The 802.11 and the 3G Wirless Debate" Intellinet Technologies-IN-IP World Forum Session Program, Orlando, FL, Mar. 12, 2003, 17 pp.

Kang et al., "Adaptive QoS Control by Toggling Voice Traffic between Circuit and Packet Cellular Networks" DATAMAN Lab, Department of Computer Science, Rutgers University, Piscataway, NJ, Dec. 2003, 6 pp.

Siebert, "System and Service Integration in Heterogeneous Networks by a Policy Based Network Architecture," Feb. 2004, 7 pp.

Skyrianoglou et al., A Framework for Unified IP QoS Support Over UMTS and Wireless LANs, University of Athens, Communication Networks Laboratory, Athens, Greece, Feb. 2004, 7 pp.

\* cited by examiner

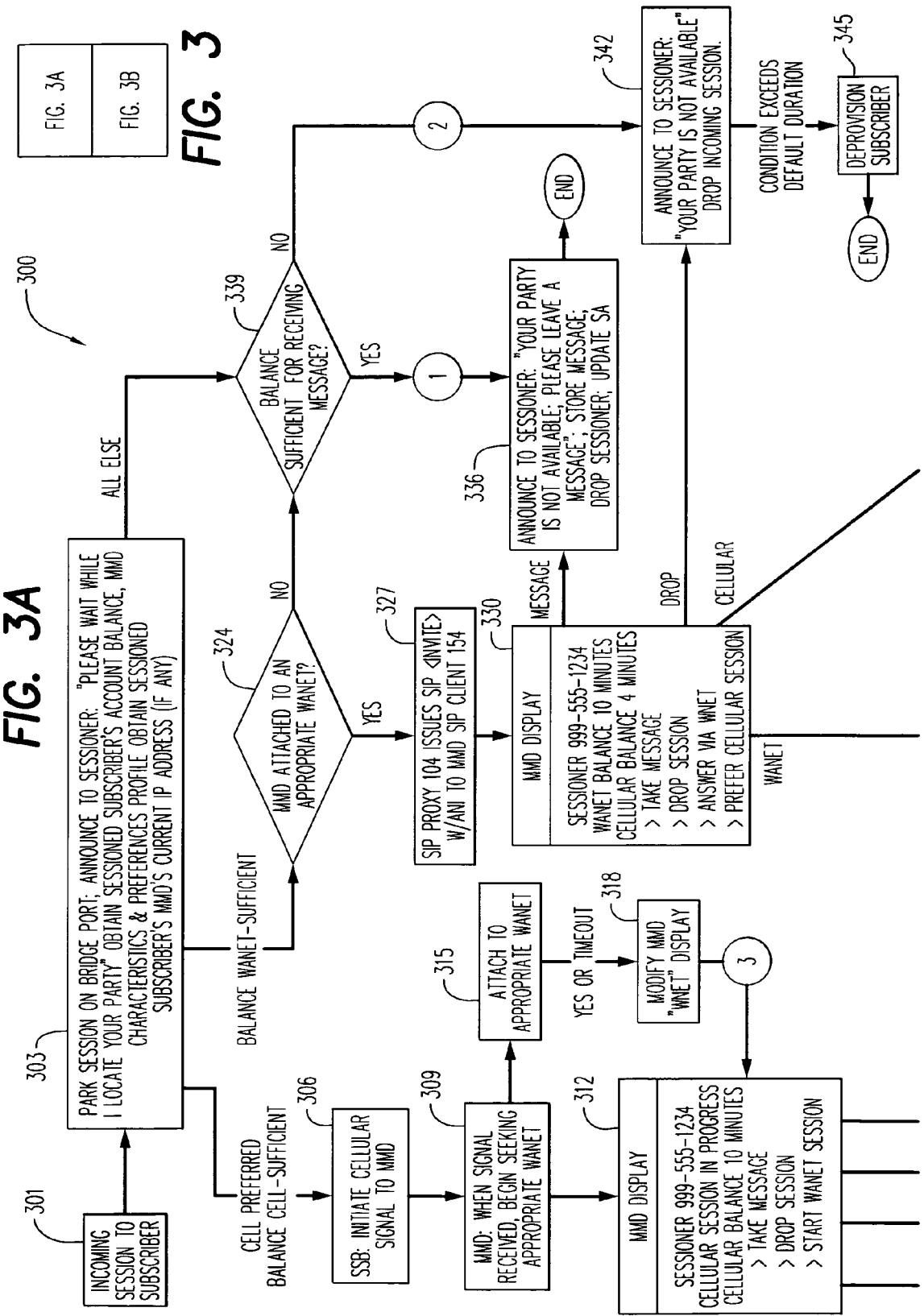

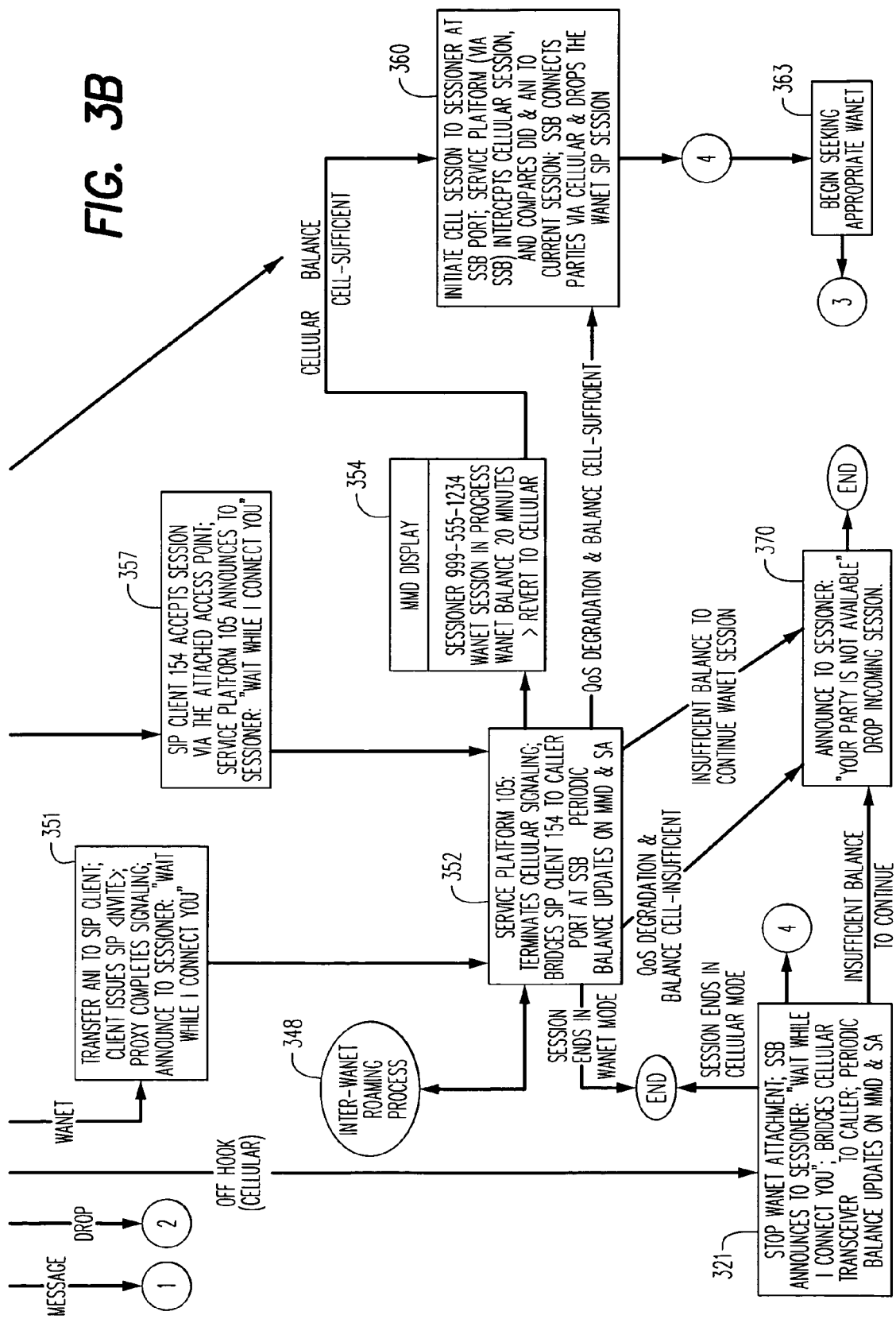

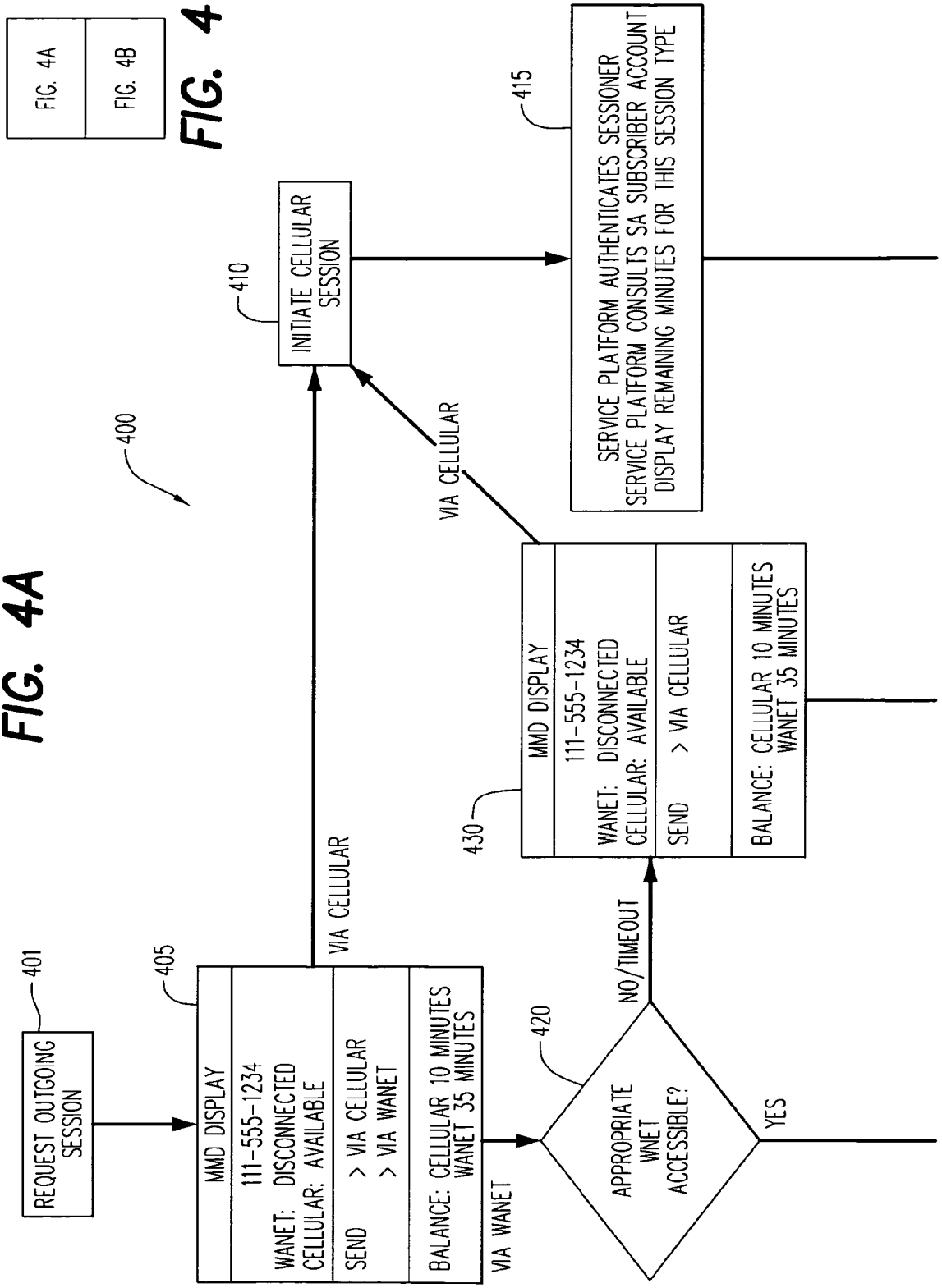

US 7,983,712 B2

MULTI-MODE WIRELESS COMMUNICATION DEVICES AND SYSTEMS FOR PREPAID COMMUNICATION SERVICES

BACKGROUND OF THE INVENTION

1. Field of the Invention

The present disclosure relates to wireless communication devices and systems. More particularly, the present disclosure relates to multi-mode wireless communication devices and systems for prepaid communication services.

2. Description of the Related Art

Multi-mode communication devices and systems, that is, devices and systems that enable communication over cellular networks and at least one other wireless ad-hoc network are now becoming available. Exemplary, multi-mode communication devices include portable telephones, portable computers, smart phones, personal digital assistant (PDA) devices, portable e-mail communication devices, and the like.

For the purpose of this disclosure, wireless cellular networks (hereinafter "cellular") shall refer to telecommunications systems/protocols such as Advanced Mobile Phone System (AMPS), Frequency Division Multiple Access (FDMA), Time Division Multiple Access (TDMA), Code-Division Multiple Access (CDMA), and 2G, 3G, 4G, and future cellular-network generations thereof. Conversely, wireless ad-hoc networks (hereinafter "WANET") refers to other wireless networks such as, but not limited to a wireless local area network (WLAN), for example, IEEE 802.11 (WiFi), a wireless wide area network (WWAN), for example, IEEE 802.16 (WiMax), and the like.

The value of WANETs is derived from, among other things, their low costs and relatively high data rates. The value of cellular networks is derived from their large, almost universal geographical coverage. However, even the most advanced 3G cellular networks do not approach the data rates of WANETs. Thus, WANETs access points can provide more bandwidth than cellular networks in smaller coverage areas, while cellular networks have lower data rates with near-universal geographic coverage. The examples given above represent the current state of technology deployment; as current ad-hoc technologies become systematically integrated into a cellular arrangement with almost universal geographic coverage, those will move into the category of "cellular networks"; similarly, as newer, (usually) faster and/or cheaper wireless access methods emerge with spotty geographic coverage, they will fall into the categories of ad-hoc networks.

Conventional multi-mode communication systems use cross-mode roaming to enable mid-session transitions between cellular networks and WANETs. Cross-mode roaming is generally triggered by subscriber mobility, quality of service (QoS) considerations, network loads, comparative network costs, and session-bandwidth requirements. Similarly, cross-WANET roaming, driven by similar considerations, is also known in the art.

Consumers of wireless communication sessions have several options available to them for payment, including prepaid services and postpaid services. Prepaid subscribers currently occupy a significant portion of the communication market. However, it has been determined by the present disclosure that current multi-mode communication devices and systems do not address the unique needs of prepaid-service subscribers.

Accordingly, it has been determined that there is a need for improved multi-mode communication devices and systems for prepaid service subscribers.

SUMMARY OF THE INVENTION

There is provided a multi-mode wireless communication device (MMD). The MMD (in the exemplary degenerate case of a dual-mode device) includes a cellular transceiver, a wireless transceiver for WANET communications, and a selector. The cellular transceiver communicates over a cellular network in a cellular mode. The wireless transceiver communicates over ad-hoc wireless networks in WANET mode. The selector selects between the cellular mode and the WANET mode. The selector uses a subscriber profile as one input to the selection for incoming and outgoing session cases.

In another aspect, an MMD is provided. The device comprises a cellular transceiver, a WANET transceiver, and an input device. The cellular transceiver communicates over a cellular network in a cellular mode. The WANET transceiver communicates over a WANET in a WANET mode. The input device allows a subscriber's input correlating to a selection between the cellular mode and the WANET mode.

In yet another aspect, a multi-mode wireless communication system is provided (in the exemplary degenerate case of a dual-mode communication system). The system includes a memory for storing a subscriber profile. The system further includes a selector. The selector selects either a cellular network mode or a WANET mode based, at least in part, on the subscriber profile.

In still yet another aspect, a multi-mode wireless communication system is provided. The system includes a selector. The selector employs a subscriber-generated parameter to select between a cellular mode and a WANET mode. The subscriber-generated parameter is received before or after an initiation of a session that employs the selector.

BRIEF DESCRIPTION OF THE DRAWINGS

FIG. 3 illustrates a flowchart of an exemplary embodiment of the device of FIG. 2 when receiving a communication session;

DESCRIPTION OF THE INVENTION

Figure 1:
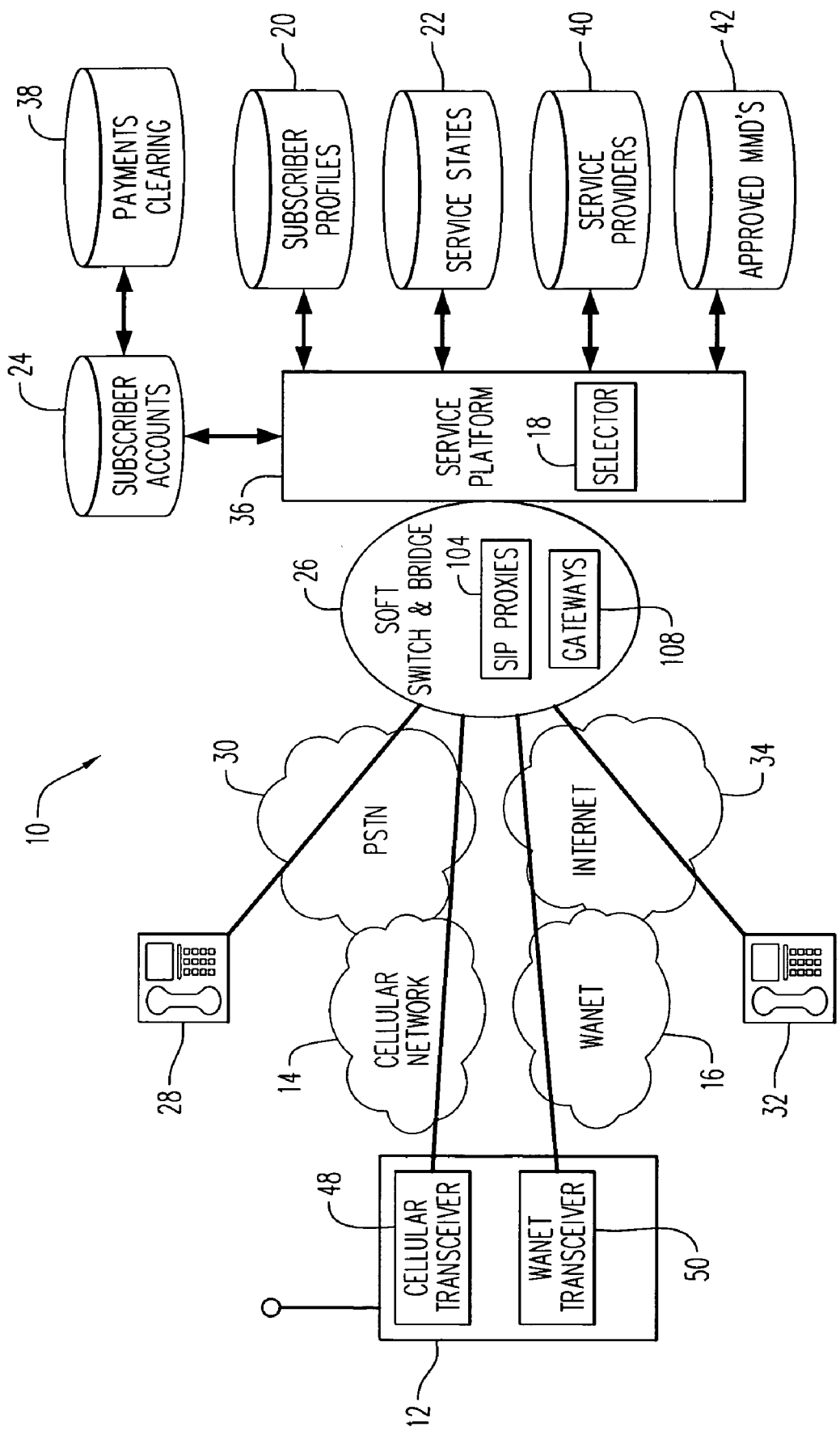
FIG. 1 illustrates an exemplary multi-mode communication system according to the present disclosure for transitioning between a cellular network and a wireless ad-hoc network ("WANET") as a function of a subscriber profile.
Figure 2A:
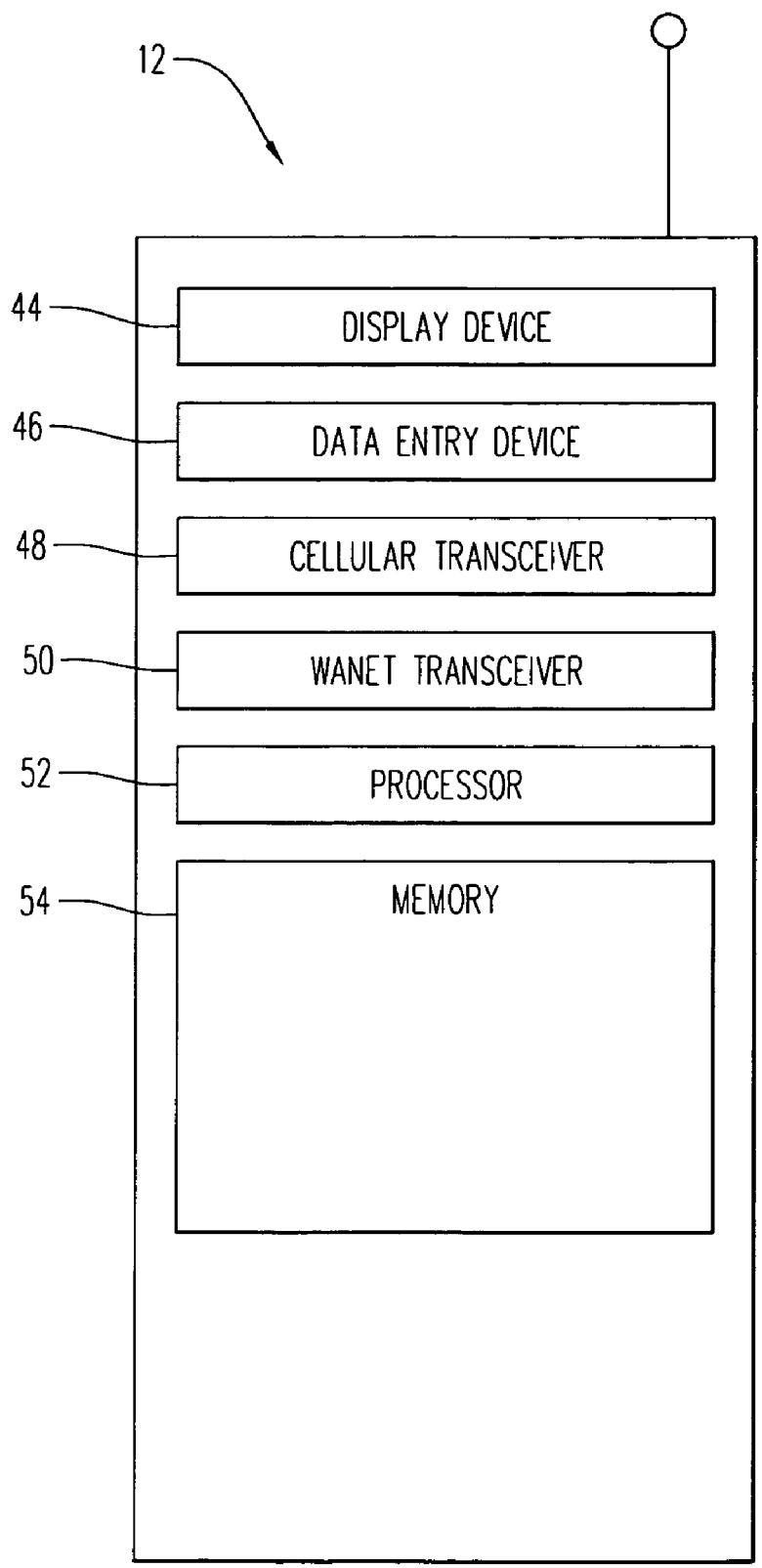
FIG. 2A illustrates an exemplary embodiment of a multi-mode communication device for use with the system of FIG. 1.

Referring now to the figures and in particular to FIGS. 1 and 2A, an exemplary embodiment of a prepaid multi-mode wireless communication system 10 and a wireless multi-mode communication device 12 according to the present disclosure are shown. System 10 is configured to allow one or more wireless multi-mode communication devices 12 (only one shown) to selectively access either a cellular network 14 or a WANET 16 as desired.

Device 12 can be a portable telephone, a portable computer, a smart phone, a personal digital assistant (PDA) device, a portable e-mail communication device, and the like.

Cellular network 14 can be, for example, an analog network (e.g., AMPS), a digital network (e.g., TDMA, CDMA), or combinations thereof. Cellular network 14 is shown as an access network communicating through a public switched telephone network (PSTN) 30; this depiction is provided for illustration of an employment of network 14. In some cases (for example, some cellular networks conforming to G2, G3, G4 and other future generations of cellular networks) may incorporate digitized media and protocols that enable global connectivity through digital networks (such as the Internet 34) supplementing or supplanting the PSTN; this disclosure includes such cases. WANET 16 can be a wireless local area network (WLAN) connection, for example, variants of IEEE 802.11 ("WiFi"), or a wireless wide area network (WWAN), such as variants of IEEE 802.16 ("WiMax") and the like. WANET 16 is shown as an access network communicating through the internet 34

Advantageously, system 10 includes a selector 18 that allows a subscriber communicating via the system to select either cellular network 14 or WANET 16 at the start of a communication session.

In some embodiments of the present disclosure, the subscriber can directly select whether to use cellular network 14 or WANET 16. In other embodiments, the subscriber can establish a subscriber profile on the system 10 so that the system automatically selects whether to use cellular network 14 or WANET 16 based at least in part on the subscriber profile.

In some embodiments, system 10 maintains the selected communication mode (i.e., cellular network 14 or WANET 16) until the end of the communication session. In other embodiments, system 10 can maintain the selected communication mode (i.e., cellular network 14 or WANET 16) until the conditions of the session change sufficiently to modify the selection based on predetermined criteria or/and the subscriber profile.

In one preferred embodiment, selector 18 can select between cellular network 14 and WANET 16 based, at least in part, on information entered by the subscriber into a subscriber profiles database 20, which is resident on system 10.

Subscriber profiles database 20 comprises data, parameters, equations, and/or rules that represent acceptable tradeoffs reflecting the relative advantages and disadvantages of the cellular network 14 versus WANET 16. System 10 uses selector 18 to select between cellular network 14 and WANET 16 based upon, for example, the subscriber profile in subscriber profiles database 20, a state of cellular network 14, a state of WANET 16, a state of a service as described in a service states database 22, and the state of a subscriber's account as reflected in subscriber accounts database 24, or any combinations thereof.

System 10 can make use of subscriber profiles database 20 in circumstances where minimizing the cost of the communication session is desired, as is common for most prepaid subscribers.

System 10 includes a switch 26 coupled to both cellular network 14 and WANET 16. Generally, switch 26 can be at least one soft switch and bridge that allows for communication between device 12 and a wireline communications device via cellular network 14 or WANET 16. The wireline communications device can include, but is not limited to, a standard telephone 28 communicating over the public switched telephone network 30 and a voice over internet protocol (VoIP) telephone 32 communicating over the Internet 34. System 10 may include at least one more device 12, wherein such devices may communicate with each other using wireless access means.

Switch 26 may interpose a media gateway 108 into the communication path as needed, based on control signals provided by service platform 36; for example, when PSTN telephone 28 dials device 12, switch 26 can interpose media gateway 108 between Internet 34 and WANET 16. Media gateways 108 are known in the art of encoding, decoding, or transcoding media to affect a match between end-user devices, and to format the media so as to enable its transmission through incompatible networks (such as the PSTN and an IP network).

When using Internet 34, switch 26 may employ an associated session initiation protocol (SIP) proxy 104 to processes session-specific SIP signals. For the purpose of this disclosure, the term "SIP Proxy" represents an aggregation of all SIP control platforms (centralized or distributed) described in relevant request for proposals ("RFPs"). SIP signals are associated with packet-based communications in general, and SIP platform and device-clients in particular. When device 12 is "bound" to a particular WANET (i.e., is linked to, and can communicate through at least one WANET access point), the SIP protocol may be used to signal between the device 12 and service platform 26 to determine the proper signaling and media path of a particular session, and ensure the compatibility of end-user devices, and the resources (e.g., gateways) requirements for each such session. Additionally, switch 26 may be used as a signaling gateway, thus enabling SIP signals to be associated with communications over both the cellular network 14 and the WANET 16.

Thus, switch 26 allows incoming and outgoing communication sessions ("sessions") to traverse either cellular network 14 or WANET 16. Switch 26 contains signaling gateways for cellular network 14 and WANET 16 to enable sessions between device 12 and VoIP telephone 32. Switch 26 also enables the temporary parking and binding of sessions between device 12 and VoIP telephone 32 or PSTN telephone 28.

System 10 includes a service platform 36 that controls the use of resources within the system 10 and coordinates the communication among them. Service platform 36 links the elements of system 10, and acts as a controller. Service platform 36 is coupled to switch & bridge 26, subscriber accounts database 24, payments clearing 38, subscriber profiles database 20, service states database 22, a service providers database 40, and approved multi-mode devices database 42.

Subscriber accounts database 24 maintains information about prepaid subscribers and their balances. Each subscriber ID in subscriber accounts database 24 corresponds to a subscriber profile stored in subscriber profiles database 20. In system 10, any subscriber may initiate a session request from device 12 via service platform 36. Service platform 36 authenticates, authorizes, and subsequently accounts for each session with the help of subscriber accounts database 24.

Subscriber profiles database 20 contains profile for subscribers who have obtained services for each of their devices 12; the profile contains information, such as maximum price per minute the subscriber is willing to pay for a WANET session, minimum QoS level acceptable for a WANET session, minimum QoS level acceptable for a cellular session, and the subscriber preference (that is, cellular or WANET) for responding to an incoming session. Since a "session" may represent more than just a voice call, it is possible that the desired session requires bandwidth (or other parameters) that cannot be addressed by the available cellular network. Portions of the subscriber's profile stored in subscriber profiles database 20 can be read and modified by that subscriber. Alternatively, a subscriber can enter a subscriber parameter at the initiation of a session, where the parameter corresponds to a selection of either cellular network 14 or WANET 16 for use in one or more upcoming communication sessions. Entering the parameter at the initiation of a session may override subscriber profiles database 20 in those cases where such override is feasible.

Service states database 22 contains information about the state of each device 12 and the states of the platforms/system components at any point in time. Service platform 36 and selector 18 use the subscriber's device state maintained in service states database 22 as partial input for making inter-network routing choices. Subscriber profiles database 20 contains the subscriber preferences of each prepaid service, and includes the type of approved device(s) 12 each subscriber uses.

Examples of information found in subscriber profiles database 20 comprise one or more of: Subscriber identity; Minimum WANET QoS class accepted for interactive voice sessions, video sessions and messaging sessions; Maximum price per min of WANET use for each session type at each acceptable QoS class; type of device 12; physical hardware/firmware/version identity/identities of device(s) 12; Type of sessions that device 12 is capable of; expected bandwidth used for each session type; Type of session preferred by the subscriber for each type of other-end device and each requested-session type; Subscriber preference for responding to an incoming cellular session from a particular, predefined caller (sessioner) or caller class; Preferred approach to account replenishment (prepaid card, cash card, credit card); minimum balance requiring a subscriber alert; and Minimum acceptable session durations for each session type (voice, text, image and video).

The information stored within subscriber profiles database 20 is used by selector 18 to choose between cellular network 14 or WANET 16. Selector 18 may typically be implemented as a function of a plurality of preference, subscriber balance, and status information. For instance, both the "Minimum WANET QoS class accepted for a messaging session" and the "Maximum price per minute of a WANET voice session at each acceptable QoS class" could be used by selector 18 to determine whether a particular device 12 is to communicate via either cellular network 14 or WANET 16.

Selector 18 queries subscriber accounts database 24 whether the prepaid subscriber has sufficient balance or prepaid-balance recharging resources to initiate a session or to respond to a sessioner. If selector 18 determines that sufficient balance exists to initiate the session, selector 18 then queries service providers database 40 for the various QoS and other information for the available (and affordable, given the subscriber's account balance) WANET(s), such as WANET 16. Selector 18 also queries subscriber profiles database 20 for device 12 capabilities. Selector 18 then uses the results of these queries to choose between cellular network 14 and WANET 16.

Selector 18, as part of service platform 36, is informed of the states of cellular network 14, WANET 16, and device 12. Service states database 22 may provide some or all of these data to selector 18. Alternately, some data may be provided directly to selector 18 by the particular component. Subscribers may use more than a single exemplar and type of device, so that the status of device 12 might select the one device currently used by the subscriber based on state information of all devices associated with the subscriber.

Payments clearing database 38 is coupled to subscriber accounts database 24. Payment clearing database 38 contains aggregate summaries of the accounts of all federated WANET participants and those of the cellular service providers. A federated WANET participant can be generally defined as a WANET service provider that has elected to be part of the prepaid system 10 accessible by particular device 12 type(s) that are servable through that provider. Payments clearing database 38 enables specific reports to be issued on cross-network operator payments. Service platform 36 uses payments clearing database 38 to calculate payment transfers to be made to and/or among members of the service providers database 40; the amounts are based upon such factors as use of each WANET, rate of pay, and so on. Payments clearing database 38 can also be used to cause periodic payments to be made to cellular and WANET accounts associated with the participants. In an alternative embodiment, the periodic (or real-time) calculation of such payments are made by a separate platform based on information provided through subscriber accounts 24.

Service providers database 40 contains data about WANET 16 access points associated with each provider, and the IP addresses and other physical characteristics associated with each access point. Information about each access point comprises the service media and capacity available, the particular standards followed, exact physical location, expected useful wireless range, and expected QoS (e.g., the real-time QoS value expected at each for incremental traffic due to each new session of a particular type). For each provider, service providers database 40 includes the prices per unit for a particular type of session at a particular data rate and QoS class, and the financial details required for payment clearing activities; service provider rates and subscriber prices may also depend on time of day/day of weak considerations. Data stored in service providers database 40 is populated by the administrative staff of the prepaid-service provider of system 10 or his agent, with suitable fields populated and edited by the administrative staff of each WANET access point service operator who wishes to join (or has already joined) the federation of WANETs providing services as part of system 10.

In some embodiments, at least some cellular service providers might also be federated; then service providers database 40 will also include information about participating cellular-service providers, and payments clearing 38 may record payments flowing from and to these cellular service providers.

In still other embodiments, there may be at least two classes of service providers in service providers database 40; one for full participation, and one that is only usable for signaling purposes; in this scenario, "open" WANET access points that have not been registered as either of those two classes would not be used for either session media (e.g., voice) or signaling. In a variation on this embodiment, service providers database 40 would include the fully participating WANETs, and a list of WANETs who have explicitly opted out from transporting even signaling information. In another embodiment, only WANETs that have opted in will be used for transporting both signaling and session media.

Although a preferred embodiment of system 10 can be used with prepaid services, it is contemplated by the present disclosure that post-paid operations, and a mix of post-paid and prepaid operations can also be served with system 10.

Service states database 22 maintains dynamic information on the state of the device 12 attachment (such as a specific 802.11 attachment point to a WANET 16). An attachment can be generally defined as a state in which device 12 is linked through an access point. Typically, there are two states of "linked". One state of "linked" is "ATTACHED"—wherein device 12 and the access point are actively communicating, and immediate session initiation is possible or already in progress. The second state of "linked" is where device 12 is aware of one or more "POSSIBLY ATTACHABLE" points within communication range, the attachments can be probed (and perhaps established given capacity, appropriateness, etc.) if needed. Service states database 22 maintains the real-time identity of the WANET 16 access point(s) attached (AND attachable) to device 12, the IP address or addresses of the access points of WANET 16, and the IP address or addresses of device 12.

Service states database 22 maintains dynamic information on the state of subscriber attachments to both appropriate and inappropriate WANETS. Inappropriate WANETS are used to signal and/or convey information to/from device 12, but do not provide legally negotiated (with the operator(s) of the disclosed system 10) services for linking subscriber sessions with sessioned or sessioning parties. "Sessioned party" is a medium-free term for "called party"; "sessioning party" is a medium-free term for "calling party". Service states database 22 may enable the transmission of signaling information through inappropriate WANETs 16. In general, "appropriate" WANETs are identified as those within service providers database 40, that have agreed to carry media, and not only signaling information.

Approved MMDs database 42 keeps information on the variety of multi-mode devices that have been certified to operate properly within system 10. Approved MMDs database 42 is maintained through provisioning and deprovisioning administrative interfaces. Information in MMDs database 42 also specifies the compatibility of each device to classes of WANETs and of cellular networks over which they may communicate; beyond "classes", MMD database 42 may specify particular networks over which each device 12 may communicate (technically and through contractual arrangements). Since some subscribers may want to use both MMDs and single-mode wireless devices (e.g., cell phones, PDAs . . . ) as part of the service, MMD database 42 may contain single-mode devices as well.

In the embodiment illustrated in FIG. 1, selector 18 is shown resident on service platform 36. It is contemplated by the present disclosure for selector 18 to be elsewhere in system 10, for example, at least in part within device 12, switch 26, and/or another subscriber-controlled device (e.g., PC) connected to System 10 via Internet 34 or PSTN 30.

It should also be recognized that subscriber profiles database 20 is illustrated by way of example as network-based, locally or remotely connected to service platform 36. It is contemplated by the present disclosure that at least part of subscriber profiles database 20 may be resident in the device 12, or distributed among elements of system 10 such as the switch 26, and other platforms/databases of the system.

Turning to FIG. 2A, device 12 can be any wireless communication device such as, but not limited to, a portable telephone, a personal digital assistant, a smart phone, and others. Preferably, device 12 includes a display 44, one or more data entry devices 46 (only one shown), a cellular transceiver 48, a WANET transceiver 50, one or more processors 52 (only one shown), and a memory device 54. Cellular transceiver 48 is configured to send and receive communications over cellular network 14, while WANET transceiver 50 is configured to send and receive communications over WANET 16.

Memory 54 is of the type sustainable through device power shutdown (e.g., flash memory) or battery cycles, and also contains the programs governing the behavior of device 12, and other functions such as inter-network gateway and media transcoding processing. Processor 52 runs an operating system and applications functions resident in memory 54. In some embodiments, memory 54 includes SIM capabilities, as is typical for GSM cellular phones and other devices.

In addition to the normal information available on display device 44, device 12 can be configured to display the amount of time that the subscriber's prepaid balance can sustain when communicating via cellular network 14 and/or WANET 16. Display 44 may also convey the mode that will be (or has been) picked by selector 18. Also, display 44 can display, in real-time, which mode is available, and can prompt the subscriber to select a particular mode (cellular or WANET). Also, the display device 44 can display information about the other communicating party, e.g., ID of in-session party, status of session, current and possible session types. Display 44 can also display network information corresponding to one or more WANETs 16 available for attachment. In some embodiments, display 44 may contain a touch screen, improving the subscriber's ease of service use, and replacing and/or supplementing data entry device 46. Federated WANETs would typically be differentiated by cost in each QoS/bandwidth service class; in one embodiment, display 44 enables assisted selection among optional WANETs (and even optional cellular service providers).

Data entry device 46 is used to enter telephone numbers, SIP addresses, email addresses, and subscriber selections. Data entry device 46 can be used to create and/or edit information resident in subscriber profiles database 20. Data entry device 46 can include, but is not limited to, a keyboard, a number pad, a voice input device, a mouse-like device, a touch screen, and any combinations thereof.

Figure 2B:
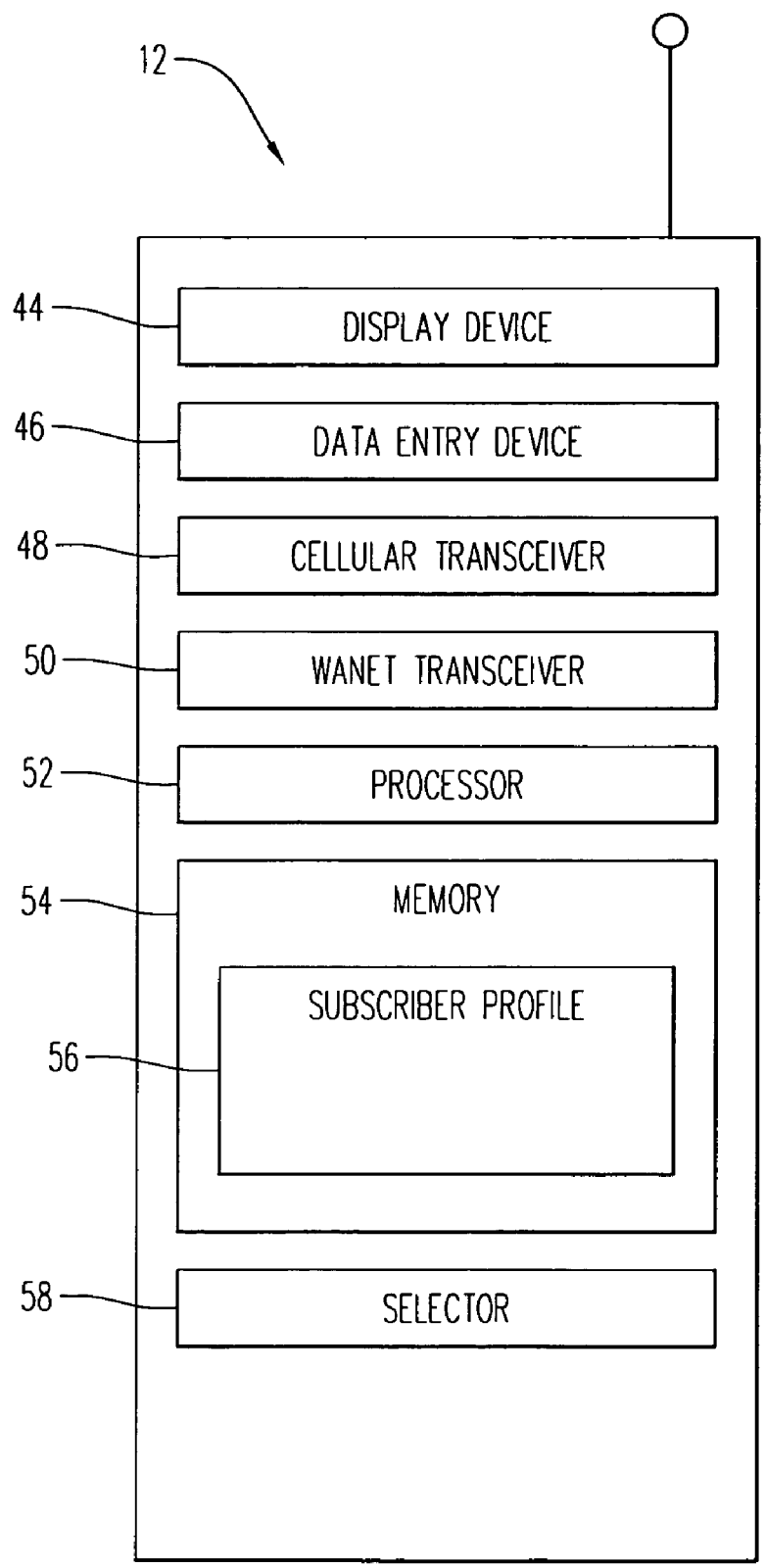
FIG. 2B illustrates an alternate exemplary embodiment of a multi-mode communication device according to the present disclosure for use with the system of FIG. 1.

Turning now to FIG. 2B, depicting an alternate exemplary embodiment of device 12 according to the present disclosure. As described above with respect to FIG. 2A, device 12 includes display 44, data entry device 46, cellular transceiver 48, WANET transceiver 50, processor 52, and memory device 54. In this embodiment, device 12 can include a subscriber profile 56 resident on memory device 54 and a selector device 58. In this manner, the functionality described above with respect to system 10 can be resident, at least in part, on the device itself instead of and/or in addition to being resident on the system. The presence of both selector 58 and subscriber profile 56 in device 12 is exemplary; the alternative embodiments including only one of these two in device 12 is also contemplated by this disclosure.

Generally, selector device 58 uses subscriber profile 56 to determine whether device 12 is to communicate via cellular network 14 or at least one WANET 16. Subscriber profile 56 can contain information similar to that discussed in reference to subscriber profiles database 20, but need only contains, at least some of the information that is applicable for the user of the particular device. Thus, selector 58 can function in a substantially similar manner to selector 18 discussed above. In some embodiments, selectors 58 and 18 can cooperate to arrive at the proper selection.

In this embodiment, display 44 may depict the mode that will be picked by selector 58 and/or selector 18 if the subscriber does not intervene through an operation such as an entry via data entry device 46; in that case, the display 44 may also depict a countdown clock to indicate the interval left for subscriber intervention/override-action before the session is initiated.

Subscriber profile 56 of memory 54 can contain information similar to that provided for the particular subscriber in subscriber profiles database 20. This information can be entered by data entry device 46 and/or can be downloaded from subscriber profiles database 20 then edited by data entry device 46 and saved into memory 54. Subscriber profile 56 can be a default subscriber profile 56, a subscriber-generated profile 56, or a subscriber-modified subscriber profile 56. The available prepaid balance can also be stored in memory 54, possibly synchronized with similar information stored in subscriber accounts 24, and depicted on display 44 in context as needed.

The present disclosure contemplates that subscriber profile 56 can be distributed between device 12 and subscriber profiles database 20. The subscriber-entered or modified profile 56 may update aspects of the subscriber's profile in subscriber profiles database 20 according to rules programmed by the service operator into Service Platform 36 or a suitable alternative in system 10.

Turning now to FIG. 3, an exemplary embodiment of a method 300 of initiating a communication session with device 12 based upon an incoming request to the device. Generally, method 300 chooses between a cellular mode over cellular network 14 and a wireless mode over WANET 16. In method 300, selector 18 makes this determination as a function of a subscriber profile (from database 20 and/or subscriber profile 56), the type of requested session (voice, text, image, video . . . ) and subscriber balance information from subscriber accounts database 24. Although the following is discussed primarily in relation to subscriber profiles database 20 and selector 18, the present disclosure contemplates that one and/or both of subscriber profiles database 20, subscriber profile 56, and selector 58 can also be used. All incoming calls arrive at switch 26 because the addresses (phone number, SIP address, . . . ) associated with all subscribers have been globally network-programmed to be forwarded to system 10 as part of a new-subscriber provisioning process, as in know in the art.

In step 301, switch 26 receives a session request for communicating with device 12. Method 300 advances to step 303. In step 303, service platform 36 directs the switch 26 to park the incoming session on a bridge port. Step 303 is only intended to be used when session-setup process 300 would otherwise incur an inordinate amount of delay (also known as "post-dial delay") that is unreasonable for the sessioner, e.g., where giving the user the option to intervene is contemplated. Where the user profile dictates the selector's output quickly, process 300 is cut short so that parking the sessioner (and subsequently bridging the subscriber) is not required. If and when the incoming session is parked, service platform 36 can cause the following announcement to be transmitted to the sessioner: "Please wait while I locate your party", where the "party" is the subscriber who uses device 12. The medium of the message may be dependent on the medium of the incoming session requested (e.g., the message may be via video, text, a meaningful graphic icon). In one embodiment, the incoming session is parked and the announcement made only after process 300 had incurred a threshold-beating post-dial delay; this is useful since it is difficult to predict the speed of a subsequent call set-up, which depends on many factors, not the least of which is the system's session-traffic load.

While parked, service platform 36 retrieves the account balance of the subscriber associated with device 12 from subscriber accounts database 24, and retrieves subscribers profile from subscriber profiles database 20 for the device. Typically, subscriber accounts database 24 contains up-to-date changes to the data present in memory 56. Also, service platform 36 retrieves the IP address (if any) of device 12 from service states database 22. If the subscriber's profile shows a preference for receiving cellular-mode communications, and the subscriber's account balance according to subscriber accounts database 24 is sufficient for the expected-duration session in the requested medium, then the method proceeds to step 306.

In step 306, service platform 36 causes switch 26 to initiate a cellular session to the cellular transceiver 48 of device 12. Method 300 then proceeds to step 309. As contemplated earlier, where device 12 is connectable through more than one (e.g., federated) cellular-service provider, step 306 includes the selection of the cellular network for subscriber call completion according to the rules inherent in the subscriber profile 56/20).

In step 309, when initial indication of an incoming session is received by device 12, the device seeks an appropriate WANET 16 access point for possible quick attachment (unless the device is already so attached). An "appropriate" WANET 16 can be generally defined as meeting the criteria as determined by selector 18, where the criteria include an association between the WANET 16 access point and at least one of the WANET service providers that are registered for such services in database 40. The presence of an MMD-related IP address detected in step 303 may mean that device 12 is attached to an either appropriate or inappropriate WANET.

In display step 312, display 44 depicts the screen displayed to the subscriber while step 315 starts. The display 44 depicts the identity of the sessioner (number or name), and the subscriber's cellular balance, such as the number of available minutes. For instance, the message could read "Sessioner 999-555-1234," "Cellular Balance: 10 minutes." Display 44 also provides the option to respond to the session via WANET (if available). Display 44 also displays action-option lines (three depicted here); these give the subscriber the option of selecting to take a message from the sessioner rather than entering into an interactive session (resulting in moving to step 336), or dropping the session altogether (i.e., not accepting the session, and moving to step 342). If the subscriber does not select from among the displayed options within the allotted time (which may be counted down visibly on display 44), the session will be handled in accordance with a default choice established by selector 58/18. The subscriber's choice can be entered through data entry device 46 (or though a touch-responsive screen represented by display 44). If the subscriber merely goes off-hook (as is the custom for cellular phones), the device 12 will respond to the cellular session in cellular mode and proceeds to step 321. The third action-option line depicted is only displayed when a WANET session is available based on the results of steps 315 and 318.

In step 315, it is determined whether an appropriate, attachable WANET 16 is discovered; if it is discovered, device 12 uses the WANET connection to so signal to a SIP proxy of switch 26, which notifies service platform 36 and changes the appropriate state flag in service states database 22. Within system 10, service states information is accessed through reading and writing to service states database 22. The time available for subscriber override of the default expires after an amount of time (a default system duration modifiable within reasonable limits by the subscriber, and stored in subscriber profiles database 20 and/or in device 12). In either case, method 300 advances to step 318.

In step 318, device 12 modifies display screen 44 to reflect the appropriate selectable options available to selector 18 of device 12.

Step 321 executes if selector 18/58 accepts the session in cellular mode; the subscriber may force that decision by going off-hook. Where multiple cellular providers are available, the selection of a particular cellular service provider implied by the off-hook action is made using selector 18/58 based on the particular incoming session and subscriber profile 56/20. In step 321, device 12 stops attempting to attach to a WANET access point. Furthermore, service platform 36 generates a message to the sessioner (who is parked at switch 26) that states "Wait while I connect you" in the appropriate session medium, then bridges the session with cellular transceiver 48 through switch 26. Furthermore, service platform 36 updates the balance depicted by as the session progresses. Service platform 36 also updates subscriber accounts database 24 as needed (periodically and/or at session end). While in step 321, when device 12 and/or service platform 36 determines that the subscriber's balance is about to be depleted, the process moves to step 370. If the cellular session ends in that mode, the process ends. In another embodiment (not depicted in FIG. 3), the device continues periodic attempts to attach to an appropriate WANET access point, and maintains the attachment (if accomplished) till the end of the cellular session; in that embodiment, the device displays (during the cellular session) a hypothetical WANET-session balance, and the action option line "revert to WANET"; when invoked, the device coordinates with the service platform 36 the transfer of the session from cellular mode to WANET mode; this embodiment also introduces an optional stage between step 321 and step 370, since "insufficient balance to continue" (the cellular session) may still enable the continuation of the session in WANET mode.

In step 370, device 12 modifies its display to show: "session dropped for insufficient balance", the session is dropped by the service platform 36, and the balance updated in subscriber accounts database 24. The process ends. Though FIG. 3 depicts the process as ending, if account-depletion conditions so warrant, the subscriber is de-provisioned as described in step 345.

System 10 contains a messaging platform (not shown in FIG. 1 nor described before), and the message is stored there while a message-waiting indicator is stored in memory 54, and displayed via display 44 to alert the subscriber that a message is waiting. This is especially useful if the message left uses a medium (e.g., video) that the subscriber's device 12 cannot handle. Therefore, the sessioner can be given a choice of media when leaving a message, where the choice is then independent of the media limitations of device 12. Messages can subsequently be retrieved (after appropriate subscriber authentication) through any mode using device 12 or an alternative wireless or wired subscriber device, which may be a simple as a plain telephone, or as complex as a multimedia PC and beyond. The messaging platform permits adaptation of messages across media. For example, the audio portion of a video-session message can be accessed using a plain telephone; the full video version is subsequently retrieved by the subscriber using a multimedia PC.

Step 342 is executed when service platform 36 selects the "Drop session" option, based on subscriber actions, on preferences determined by selector 58, or on explicit subscriber invoking to the "drop session" MMD display 312/330 option. When executed following steps 352 or 339, step 342 is executed for insufficient funds. In all cases, service platform 36, through switch 26, announces to the sessioner: "Your party is not available", the session is then dropped, and the process ends. When step 342 is invoked due to insufficient subscriber funds, and the funds drop below a pre-established, administratively set limit (e.g., $0.00 or some negative threshold), then, in step 345, service platform 36 can cause the device 12 to be de-provisioned from system 10. Deprovisioning can be generally defined as the elimination of an existing subscriber's account. Depending on the severity of the financial situation, deprovisioning of a subscriber account may include subscriber account deregistration and device(s) deactivation.

When selector 18/58 selects the "WANET" option, step 351 is executed. This selection happens for one of two reasons: (i) the subscriber selects the "start WANET session" action-option line on MMD display 312/330, or (ii) the incoming session matches subscriber-profile criteria selecting WANET use, and the subscriber makes no selection after the action-option override line is displayed, and a delay threshold has passed. In step 351, the identity (e.g., phone number) of the sessioner (i.e., session requestor) is transferred from the cellular-transceiver section 48 to the SIP-client section of device 12. If ANI transmission had been blocked by the sessioner, then service platform 36 through switch 26 inserts a unique phone-number-like substitution into the signaling of the original incoming cellular session. The SIP client 154 issues a SIP <invite> signal to the session originator through switch 26 via a SIP proxy. Where no ANI was available, the address of the SIP <invite> is the unique number or address inserted by service platform 36. The SIP Proxy resolves the SIP address, with the help of the service platform 36 (and thus service states database 22), so as to associate it with the session originator's holding port in switch 26. Service platform 36, through switch 26, announces to the sessioner: "Please wait while I connect you."

The process continues with step 352. In step 352, service platform 36 (through SIP Proxy 104 and the SIP protocol) then directs the switch 26 to bridge the originator's parked session port to the port assigned to SIP Client 154, and the session commences via the WANET, with associated display-step 354. Service platform 36 uses rating (unit price) data from subscriber accounts database 24 (permitting service platform 36 to calculate session-cost thus far) to update display 44 as to amount of time and/or money left on the account. Upon session termination, service platform 36 generates a session-detail record and updates subscriber accounts database 24, and the process ends.

During step 352, degradations in QoS (as determined by selectors 58/18) that can be corrected by roaming among inter-WLAN access points are performed in process 348. If there is QoS degradation below an allowed/tolerable level that process 348 cannot resolve, and if the balance in the subscriber's account is insufficient for moving the session to cellular mode, then the process moves to step 370; however, if there is sufficient balance to continue the session in cellular mode (and selectors 58/18 so determine), the process continues in step 360. The process continues in step 360 only if there is sufficient balance left in the subscriber's account to permit a cellular-network-accessed session of the minimum duration dictated by system default as possibly modifies in the subscriber profile, and at least one of the following conditions is true: (i) The QoS of the WANET session deteriorates below system or subscriber-profile settings, and roaming process 348 cannot improve the QoS within subscriber profile constraints and a time limit; (ii) if the "revert to cellular" mode is invoked in display step 354. While in step 352, if device 12 or service platform 36 determine that the subscriber's balance is about to be depleted, the process continues step 370.

Display-step 354 depicts the content of display 44 at the beginning of the WANET session; it shows the sessioner's telephone number (or the substituted inserted number), an indication that the communications mode is a WANET mode, and the WANET account balance as provided by the service platform 36 from data in the subscriber accounts database (the data may have been pre-stored in the device 12 as well). Further, display 44 shows the action-option line of "revert to cellular" as an option to be invoked at the subscriber's option at any time during the session. The account balance (in terms of session minutes) is periodically updated and depicted on display 44 during the session; update interval is an administrative system-wide input, perhaps modifiable by each subscriber as part of subscriber profiles database 20. If at any time the account balance drops below that required for a minimum-duration cellular option, then the "revert to cellular" option is dropped from MMD display step 354. In an alternative embodiment, the balance of a potential cellular session time (if the "revert to cellular" option is invoked) is also displayed and updated in addition to the already displayed WANET session minutes balance.

Step 348, which can be a process, is used to roam among appropriate WANET access points as dictated by quality of service considerations as they change over time; these changes may occur as a result of subscriber mobility, access-point traffic-load changes, or QoS problems upstream of the access point. Such roaming processes are known in the art, and not further described here; this disclosure adds that pre-paid-subscriber balance consideration affect the viability of inter-WANET roaming based on WANET-use costs stored in service providers database 40. Roaming from WANET 16 to cellular network 14 is discussed in step 360.

In step 360, a cellular session is initiated by device 12 (cellular transceiver 48) to the sessioner's number based on the real or made-up ANI number provided earlier to device 12 by service platform 36 when the session was requested. The session is initiated by device 12 to ensure that the at least one of cellular network 14 is able to handle the session before committing to the change from WANET mode. All outgoing subscriber calls are intercepted by service platform 36; the new cellular session is thus intercepted and bridged by switch 26 to the sessioning party by matching the dialed number to the ANI of the originator of the session. The service platform 36 then instructs switch 26 to release the bridge port originally connected to the WANET-accessed device. Where the sessioner's ANI is blocked, the fictional number inserted by service platform 36 and/or switch & bridge 26 acts as an appropriate proxy number to ensure that the right sessioner port is bridged to the subscriber's cellular call. In another embodiment, the service platform 36 and/or switch & bridge 26 initiate the call to subscriber device 12, and the call is completed as an incoming cellular call. Step 363 is invoked while step 360 is in the middle of the cellularly accessed session, so that WANET alternatives may be invoked if/when needed.

In step 363, WANET transceiver 50 of device 12 begins to seek attachment to a WANET access point, trying to reduce the cost of the session, and perhaps enhance its bandwidth for such session media as video. If and when an appropriate WANET connection is found and attachment successful, the display 44 adds a "WANET Session available", enabling the subscriber to revert to a WANET session by invoking it from a screen/data entry device. Since WANET seeking and attachment state are MMD-battery hogs, this option is only enabled at the explicit invocation of selectors 58/18. FIG. 3 depicts the reuse of MMD display 312 as a convenient simplification, and the cellular session initiated in step 360 continues.

In step 303, if "Cell preferred" is not an active (based on the particular detail of the incoming session) rule in subscriber profiles database 20, it is determined by selector 18 that WANET 16 is acceptable to the sessioned party (i.e., the subscriber's device 12); then method 300 determines whether the balance associated with the sessioned party, as stored within subscriber accounts database 24, is sufficient to initiate a WANET-mode session with the session initiator. If the balance is sufficient for the predetermined minimum duration, step 324 executes.

In step 324, it is determined whether device 12 is attached or can be attached in time to an appropriate WANET, such as a given WANET 16 access point. If device 12 is not attached, but is attachable, then WANET transceiver 50 attempts to complete attachment procedures. If attachment is unsuccessful, and there is sufficient balance for a cellular session, and the conditions match an appropriate rule in subscriber profile 56/20, then selector 58/18 determine whether to proceed to step 306 for answering in Cellular Mode, or to step 339 for taking a message. If device 12 is attached, method 300 advances to step 327, and SIP signaling between Sip Client 154 and service platform 36 via a SIP proxy (of proxies 104) commences over the WANET link, as described in step 327, with the objective of setting up a WANET-accessed incoming session.

In step 327, the sessioner's ANI is transferred from the MMD's cellular transceiver 48 to its SIP client 154. Service platform 36 announces to sessioner "wait while I connect you." Then, the connection is established as discussed in earlier steps via SIP proxy 104 and switch 26, and the method advances to step 357 unless changes are invoked through subscriber action-option lines in display step 330.

In display-step 330, display 44 shows the telephone number of the sessioner. Furthermore, display 44 displays the balance associated with WANET mode, and optionally the balance associated with cellular mode. Display 44 lists for the subscriber the action-option lines of taking a message, dropping the session, answering in WLAN mode, or answering in cellular mode. Once the session commences, display 44 changes to resemble that of display step 354 if a WANET session results, permitting the subscriber to revert to a cellular session if conditions and account balance so permit. From display step 330, the process moves to step 336 if (i) there is a connection timeout, i.e., selectors 58/18 do not select an available option within the allowable interval (for example, as is possible if device 12 was unable to re-establish and maintain attachment to a WANET access point), if (ii) the subscriber invokes the action-option line "take message", or if there is insufficient balance in the subscriber's account 24 to complete a default/minimum-duration WANET session in the required medium (voice, text, image, video). From display step 330 the process moves to step 342 if the subscriber invokes the action-option line "Drop session", or if there is insufficient balance in the subscriber's account 24 to even take a message. From display step 330 the process moves to step 360 if the subscriber invokes the action-option line "Prefer cellular session" and there is sufficient balance for a default/minimum duration of such session. Similarly, invoking the "prefer cellular session action-option line moves the process to step 360 (if the account balance is sufficient). The process moves to step 357 if so designated by selector 58/18, or if invoked by the subscriber through the "answer via WANET" action-option line.

In step 336, service platform 36 (through switch 26) announces to the sessioner "Your party is not available; please leave a message". Then, the message from the sessioner, if any, is stored in a messaging platform (not depicted in FIG. 1), and the process ends. In an alternative embodiment, the session is dropped by device 12, which is keeping track of the balance of the account for the purpose of displaying remaining session time to the subscriber. The medium of the message may be a voice announcement or other media depending on the nature of the session requested (e.g., the message may be via video, text, a meaningful graphic icon). The messaging platform may reside, at least in part, in MMD 12, but the cost (charged against the subscriber's account) of saving the message in MMD 12 will, in general, be higher because that requires the use of a network connection between switch & bridge 26 and MMD 12, whereas the cost of message retrieval from a messaging platform could be subsequently borne by a re-charged prepaid account.

Step 357, when the wireless mode is selected, WANET transceiver 50 picks up the telephone session (i.e., goes "off hook"). Service platform 36 (via the switch 26 port) announces to the session originator: "Please wait while I connect you". The process continues in step 352.

If device 12 can not attach to an appropriate WANET access point in step 324, step 339 is executed. Furthermore, if in step 303, it is determined that the subscriber has insufficient balance to initiate either a WANET or a cellular session, the method also advances to step 339.

In step 339, it is determined whether the balance of the device 12, as stored in subscriber accounts database 24, is sufficient to allow for the reception and storage of a message. If it is, method 300 advances to step 336, detailed above. If it is not, method 300 advances to step 342, also detailed above.

In step 303, the "all else" decision criteria also comprises mismatches between the incoming session's media and the capabilities of device 12. If another device registered to the same subscriber is compatible with the incoming session media, and the subscriber profile 20 permits it, then service platform 36 may engage the resources at its disposal to redirect the incoming call to said subscriber's compatible device.

Figure 4B:
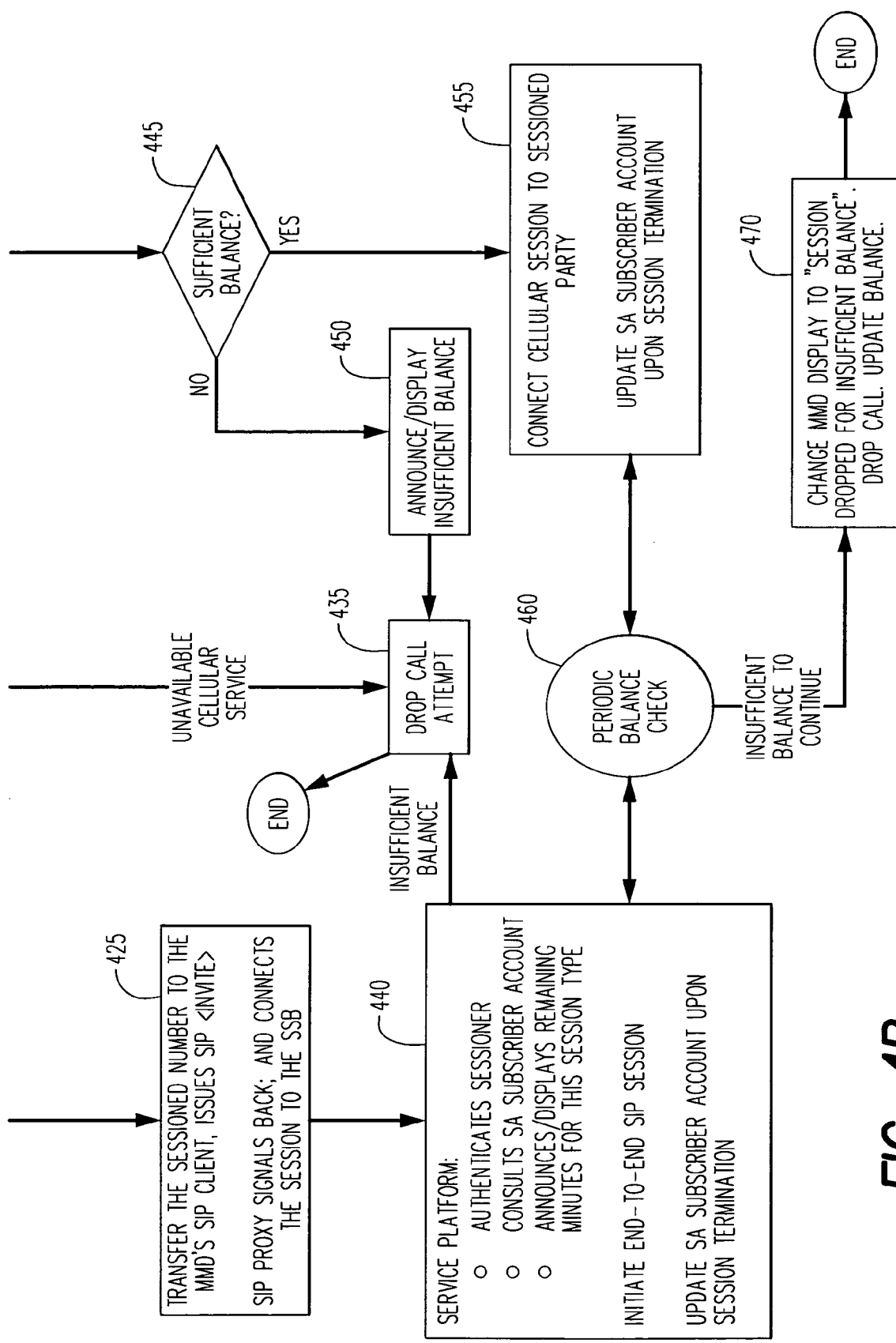
FIG. 4 illustrates a flowchart of an exemplary embodiment of the device of FIG. 2 when initiating a communication session.

FIG. 4 illustrates a method 400 for initiating a session by a subscriber using MMD 12. Generally, method 400 chooses between a cellular mode over cellular network 14 and a WANET mode over WANET 16. In method 400, selector 58 makes this determination as a function of a subscriber profiles database 20 and/or subscriber profile 56, the states (in Service States 22 and/or conditions/subscriber-input sensed by device 12) of cellular network 14 and WANET 16, and the subscriber's balance stored in subscriber accounts database 24 and/or device 12 memory 54. Although the following discussion uses subscriber profile 56 and selector 18, the present disclosure contemplates that either and/or both of subscriber profiles database 20, subscriber profile 56, selector 58, and selector 18 can be used.

In step 401, the subscriber enters an outgoing address, e.g., a phone number/SIP address, or selects an entry from a contact list through the MMD screen/data entry device (i.e., display 44 or data entry device 46). Device 12 sends a request for an outgoing session through the mode selected by selector 18. In general, if attached or attachable to a WANET access point, the selector is likely to use the WANET for signaling the request when the subscriber's profile, account balance, session media, and comparative quality and costs so dictate. Using an attached access point for obtaining relevant system 10 data prior to invoking a call may cut post-dial delay time. Display step 405 assists the subscriber in initiating the outgoing session.

Display step 405 depicts display 44 immediately after step 401; it includes the address (e.g., telephone number) to be sessioned, the status of the WANET 16 attachment state (i.e., whether connected or disconnected), and the status of cellular connectivity, (i.e., whether available or unavailable) through cellular network 14. Also, the balance available for the outgoing session in either mode is presented to the subscriber on display 44, possibly in the form of the max duration of the upcoming session in terms of time, which is dependent on the session's media. For instance, for a given balance, the max length of a cellular session could be 10 minutes, but the max length of a WANET session could be 25 minutes. Not shown in FIG. 4 (display step 405) are additional possible subscriber action-option lines related to multiple WANETs and session media (voice, text, image, multimedia); these will affect the price of the session per unit time; certain media may be covered as part of non-linear or flat-rate pricing in one or more modes, and the max session duration will reflect that. Additionally not shown or described is the option for multiple cellular providers that may be available for outgoing calls.

Selector 18 may add default media-selection information to the display screen based on subscriber profile 56, and device-specific information about the sessioned device if pre-stored in the contact list, which is stored in memory 54 and/or in subscriber profiles 20. Then, the subscriber using device 12 selects from among the action-option lines depicted on display 44 thus determining the desired mode (cellular or a particular WANET) of the outgoing session. In the absence of such input at the time of session initiation, selector 18 (used to represent 58/18) automatically makes a selection of either the cellular mode or the wireless mode.

Step 410 executes if selector 18 initiates a cellular session in cellular mode; that is, the entered address is transferred to Cellular transceiver 48 for dialing if device 12 indicates the balance of the account is sufficient for the minimal cellular session. In case of multiple cellular service providers, the particular carrier is manually or automatically selected. Method 400 then advances to step 415

In step 415, service platform 36 authenticates the subscriber's device 12; Service platform 36 consults subscriber accounts database 24 and announces through (and/or displays on) device 12 how many minutes are available for the communication with the sessioned party using the desired cellular media (media may be variable when using such advanced cellular standards as 2G, 3G and beyond); step 415 then advances to step 445.

In step 445, as an anti-fraud security measure, it is determined by service platform 36 if there is a sufficient balance. If there is, then step 455 is executed.

In step 455, the cellular session is connected to the sessioned party once the latter responds to the signal. Step 455 then advances to step 460.

In step 460, there is a periodic account-balance check, which updates MMD display 44 and subscriber accounts 24. If the balance drops below a pre-established minimum threshold required to sustain the session, method 400 proceeds to step 470, which changes display 44 to "session dropped for insufficient balance." The session is dropped by either device 12 or service platform 36, the balances in device 12 and subscriber accounts 24 are updated, and the process ends. In a preferred embodiment, the subscriber is given a series of on-screen and/or audio warnings as the balance depletes toward the minimum threshold. In another embodiment, if the MMD is attached or attachable to an appropriate WANET access point, the selector 18 may continue the session in WANET mode as described is step 363.

Step 450 is executed when service platform 36 determines that there is insufficient subscriber balance to initiate a cellular phone session. As described in step 460, the subscriber/selector 119 may still attempt to convert to a WANET session if an appropriate WANET access point is attached or attachable; if not, in step 450, "insufficient balance" is announced/displayed, and step 435 is executed.

In step 435, the cellular session attempt stops, the subscriber's balance is updated (SA 24 and device 12) and the process ends in its original state; this state may enable further outgoing WANET sessions, incoming sessions and messaging activities, for which there may be sufficient balance in subscriber accounts 24.

In step 405, if selector 18 instead selects WANET mode, then step 420 is executed. In step 420, it is determined whether an appropriate WANET 16 is accessible; if it is, method 400 advances to step 425. If an appropriate WANET 16 is not available, method 400 advances to step 430.

In step 425, the telephone number/SIP address of the sessioned number on the MMD display 44 is transferred to SIP client 154. The SIP client then issues a SIP <invite> via WANET 16 to SIP proxy 104. SIP proxy 104 then signals back, and method 400 advances to step 440. In step 440, service platform 36 authenticates subscriber's MMD 12. Service platform 36 also accesses subscriber accounts database 24 to determine how the subscriber's account balance associated with device 12. Service platform 36 initiates an end-to-end SIP session from the device 12 over WANET 16 to the sessioned party. As in step 460, during the session and upon its termination, service platform 36 updates the balance stored in subscriber accounts database 24 and device 12; the latter updates the balance of time on display 44.

However, if there is insufficient balance for beginning, or during, the session for using WANET within step 440, method 400 advances to step 435.

In step 420, however, if there is no appropriate WANET 16 that is accessible within the timeframe available, then display step 430 is enacted. In step 430, display 44 of device 12 changes original display step 405 so as to depict the unavailability of the WANET mode, and limits the "send" option via Cellular mode only. If cellular connectivity is available and the subscriber's account balance is sufficient for a cellular session, method 400 advances to step 410, which continues as described earlier, though the affordability test 445 can be skipped (already verified). If there is no cellular network 14 available, step 430 advances to step 435, which drops the session attempt and stops while displaying the situation of display 44.

Figure 5:
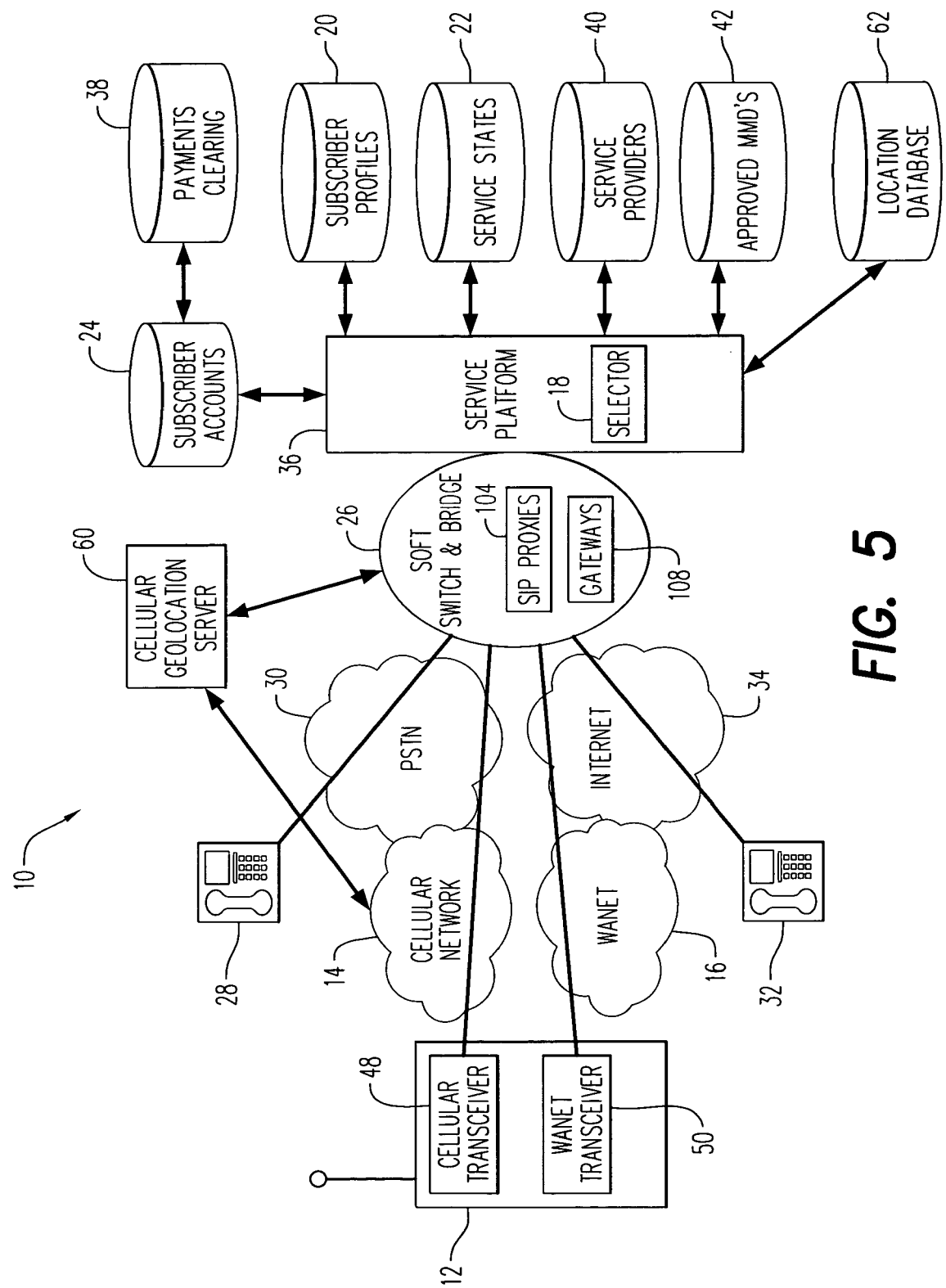
FIG. 5 illustrates an alternate exemplary multi-mode communication system according to the present disclosure.

Referring now to FIG. 5, an alternate exemplary embodiment of the prepaid multi-mode wireless communication system 10 according to the present disclosure is shown. Here, system 10 also includes a cellular geolocation server 60 and a location database 62.

In another embodiment, cellular geolocation server 60 provides the approximate location of device 12 as needed, in order to direct the subscriber to desired location, as needed. The desired location is stored in locations database 62, which can include a number of desired locations. The desired locations can comprise a location of a WANET access point, a location of an account-balance-replenishment facility, and others. In this manner, system 10 can guide the subscriber who is the user of MMD 12 to a nearby WANET access point so that the subscriber can communicate via WANET 16 when desired, or to a nearby replenishment facility as the account balance draws down. GPS (Global Positioning System) apparatus is routinely embedded within newer cellular telephones, at least in the US, to enable 911 emergency service responses to the location of the telephone; it is envisioned that GPS apparatus will be similarly embedded in multi-mode devices; the cellular geolocation server 60 may make use of the GPS apparatus, or use alternative methods such as cellular-tower triangulation, ad-hoc wireless-station triangulation, or an advantageous combination of the two.

In some embodiments, database 62 can include additional information associated with the location, such as hours of operation. It is likely that most WANETs will be operating fulltime (24 hours a day, 7 days a week), but the "hours" feature will enable the elimination of WANETs from possible access point recommendations when they are closed for maintenance; on the other hand, replenishment facilities are likely to be open during specific hours when they are located in retail stores; those that are automated (e.g., kiosk-based replenishment), will be normally open except during maintenance periods.

The process for provisioning a new service provider into service providers database 40 can include a step in which the geographic locations of appropriate WANET access points are provided. The location can be determined by associating a street address to a position via a Global Positioning System (GPS), or through direct GPS readings at the access points. Similarly, the locations of prepaid-account-replenishment facilities can be entered at the time such facilities are provisioned into the service. Nearby account-replenishment-facility locations may be conveyed to the subscriber in the form of street addresses, and the source of the subscriber's device location need not be precise; for example, the location of the cellular antenna that is tracking the MMD, and the likely range of that cell site are probably sufficient, since the subscriber will be provided with multiple replenishment locations within the designated cell, and may select the ones closest to the device's location. Hence, the service required from cellular geolocation server 60 is less complex (and less costly) for the purpose of identifying nearby recharge facilities.

When a session addressed to the subscriber's device 12 arrives, system 10 determines (via selector 18/58) whether to connect via cellular network 14 or WANET 16. For example, system 10 can take into account the position of device 12 (determined by server 60) and the position of the closest appropriate WANET location (from database 62). System 10 will use cellular network 14 if device 12 is not sufficiently close to an appropriate WANET to connect to that WANET in time to respond to the "call". Of course and as described above, system 10 will not answer the call using cellular network 14 if the profile in database 20, specifies: "Never respond to a cellular call", or the subscriber explicitly chooses (via the display screen 44) not to respond via cellular mode, or there is insufficient prepaid balance to respond to the "call" with a cellular session.

Service platform 36 can compare the approximate location of the device 12 as obtained from cellular geolocation server 60 with the locations of nearby appropriate WANET access points as obtained from database 62, and provides the nearest street addresses of those appropriate WANET Access Points that: (i) can accommodate a session with the "caller" within the available prepaid balance, and (ii) can accommodate such additional session within the QoS limits defined in the profiles database 20.

Additionally, the service platform can send to the subscriber information about the addresses of nearby account-replenishment facilities; these addresses can be depicted on display 44.

When the MMD 12 is equipped with GPS, service platform 46 can provide detailed direction to WANET access point and/or to account-replenishment facilities as is know in the art.

When an incoming session is declined by the subscriber, screen 44 may display the option: "remember calling party". Invoking that option would be signaled to service platform 36, which will announce to the sessioner: "expect a callback soon". Once the account has been replenished, and/or an appropriate WANET is attached to device 12, the subscriber may invoke a "session-back prior party" to easily establish the connection.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A multi-mode wireless communication device, comprising:
   a cellular transceiver for communicating over a cellular network in a cellular mode;
   a wireless transceiver for communicating over a wireless ad-hoc network in an ad-hoc wireless mode; and
   a selector for making a selection between operating in said cellular mode and said wireless ad-hoc mode, said selector using financial data of a subscriber, and at least one of a subscriber profile, communication-session medium type, availability of a cellular network, and availability of a wireless ad-hoc access point to make said selection, wherein said selector resides, at least in part, in the multi-mode wireless communication device.

2. The multi-mode wireless communication device of claim 1, wherein said subscriber profile is defined, at least in part, by a subscriber.

3. The multi-mode wireless communication device of claim 1, wherein said subscriber profile comprises an attribute selected from the group consisting of a quality of service threshold for said ad-hoc wireless mode, for a specific communication-session medium type, a maximum price per unit for said ad-hoc wireless mode, a subscriber preference for responding to an incoming cellular session, and any combinations thereof.

4. The multi-mode wireless communication device of claim 1, wherein said ad-hoc wireless network is selected from the group consisting of a local area network, a wide area network, and any combinations thereof.

5. The multi-mode wireless communication device of claim 1, wherein said cellular network is selected from the group consisting of an analog network, a digital network, a time division multiple access network, a code division multiple access network, and any combinations thereof.

6. The multi-mode wireless communication device of claim 1, wherein said subscriber profile resides, at least in part, in the multi-mode wireless communications device.

7. The multi-mode wireless communication device of claim 1, wherein said selector checks an available account balance when a session is initiated for either an outgoing or incoming session.

8. The multi-mode wireless communication device of claim 7, wherein said available balance is stored on the multi-mode wireless communications device.

9. The multi-mode wireless communication device of claim 1, wherein the multi-mode wireless communication device is selected from group consisting of phone, a computer, a personal-digital-assistant, and any combinations thereof.

10. The multi-mode wireless communication device of claim 1, further comprising a data entry device.

11. A multi-mode wireless communication device, comprising:
    a cellular transceiver for communicating over a cellular network in a cellular mode;
    a wireless transceiver for communicating over at least one ad-hoc wireless network in a wireless mode;
    a selector that selects either said cellular mode or said wireless mode based at least in part on a subscriber profile; and
    an input device that allows a subscriber input correlating to a selection between said cellular mode and said wireless mode, wherein said input device overrides a portion of said subscriber profile.

12. The multi-mode wireless communication device of claim 11, further comprising an output outputting cost options to the subscriber to assist in generating said subscriber input correlating to said selection between said cellular mode and said at least one ad-hoc wireless network in a wireless mode.

13. The multi-mode wireless communication device of claim 11, wherein said input device inputs information into said subscriber profile.

14. The multi-mode wireless communication device of claim 11, wherein said selector employs a plurality of subscriber inputs, situated at least in part within said subscriber profile to make said selection.

15. A multi-mode wireless communication system, comprising:
    a memory for storing a subscriber profile comprising financial data of a subscriber; and
    a selector that selects either a cellular network mode or a wireless network mode based at least in part on said subscriber profile wherein said selector resides, at least in part, in the multi-mode wireless communication device,
    wherein said selector transitions between said cellular network mode and said wireless network mode in mid-session as a function that includes a financial characteristic of said cellular network mode and said wireless network mode.

16. The multi-mode wireless communication system of claim 15, wherein said selector checks an available account balance when a session is initiated for either an inbound or outbound communication.

17. The multi-mode wireless communication system of claim 15, wherein said selector is resident, at least in part, outside of a multi-mode device.

18. The multi-mode wireless communication system of claim 15, wherein said selector selects a wireless ad-hoc network, when in said wireless network mode, from one or more available wireless ad-hoc networks.

19. The multi-mode wireless communication system of claim 15, wherein said subscriber profile is selected from the group consisting of a default subscriber profile, a subscriber generated subscriber profile, a subscriber-modified subscriber profile, and a service modified subscriber profile.

20. The multi-mode wireless communication system of claim 15, wherein the multi-mode communications system is a prepaid system.

21. The multi-mode wireless communication system of claim 15, wherein said subscriber profile contains an indication of a preference of either said cellular network mode or said wireless network mode for an incoming or outgoing communication.

22. The multi-mode wireless communication system of claim 15, wherein said cellular network mode is used to convey signaling information, but not media content.

23. The multi-mode wireless communication system of claim 15, further comprising a cellular geolocation server and a location database, said cellular geolocation server providing an approximate location of a multi-mode device and comparing said approximate location to a desired location stored in said location database.

24. The multi-mode wireless communication system of claim 23, wherein said desired location comprises a location of a wireless ad-hoc network access point, a location of a balance-replenishment facility, and any combination thereof.

* * * * *